United States Patent [19]

Hamilton

[11] 4,284,030

[45] Aug. 18, 1981

[54] ROTARY DISPENSING CHAMBERS WITH SIMULTANEOUS SIZE ADJUSTMENT

[76] Inventor: Joel A. Hamilton, 101 Hardenburgh Ave., Demarest, N.J. 07627

[21] Appl. No.: 158,321

[22] Filed: Jun. 10, 1980

[51] Int. Cl.³ ............................................. B05C 5/02
[52] U.S. Cl. .................................. 118/406; 141/368; 222/306
[58] Field of Search ..................... 222/306, 307, 308; 141/152, 367, 368; 118/212, 406

[56] References Cited

U.S. PATENT DOCUMENTS

| 709,793 | 9/1902 | McGinnity | 222/306 X |
|---|---|---|---|
| 2,684,186 | 7/1954 | Mattos | 222/306 X |
| 3,446,404 | 5/1969 | Mehta | 222/306 X |

*Primary Examiner*—John P. McIntosh
*Attorney, Agent, or Firm*—Ralph R. Roberts

[57] ABSTRACT

The rotary dispenser of this invention includes a plurality (such as ten) of outer disk-like members of which each is formed with a plurality of like-sized and spaced pockets. Each outer disk is supported and positively positioned by an inner tubular supporting member. This member is carried by a tubular shaft carrying all rotary dispensers. Each pocket in the outer disk is closed by a spring strip having resilient side supports. Pins are carried in guideways and the outer end of each pin engages the bottom spring-like strip and the other end of the pin is carried on and is moved in and out by a conical ring carried by a spine shaft movable within the tubular shaft. This spine shaft is moved longitudinally by a threaded portion rotatably carried by a nut secured to the tubular shaft. The dispenser is rotated with the same peripheral speed as a travelling web of material.

16 Claims, 9 Drawing Figures

ROTARY DISPENSING CHAMBERS WITH SIMULTANEOUS SIZE ADJUSTMENT

BACKGROUND OF THE INVENTION

1. Field of the Invention

With reference to the classification of art as established in and by the U.S. Patent Office the present invention is believed to be in the General Class identified as "Dispensing" (Class 222) and in the subclass therein entitled, "movable or conveyor-type trap chamber with capacity varying means-single inlet-outlet, adjustable bottom" (subclass 306) and the subclass thereunder entitled, "wall with straight line movements" (subclass 307) and the further subclass entitled, "screw adjusting means" (subclass 308).

2. Description of the Prior Art

Dispensing apparatus using hoppers in which powder or granular material is fed to a rotary disk having pockets provided are well known. This material is fed downwardly in this hopper and at a discharge outlet the material is fed to a pocket on the rotating disk. This pocket is filled as it is rotated and then is closed by a shroud portion. At a later point in the rotation of this disk the pocket is emptied by transferring the contents of the pocket onto a travelling web of film and the like. This concept is not new and a careful pre-Ex search of the art developed the following patents which have been carefully considered. Rotary dispensers are very old in the art as in SHELDON, U.S. Pat. No. Re. 8,938 of Oct. 21, 1879; SMITH et al, U.S. Pat. No. 507,177 of Oct. 24, 1893; MC GINNITY, U.S. Pat. No. 709,793 of Sept. 23, 1902; SALFISBERG, U.S. Pat. No. 2,472,440 of June 7, 1948; STEELE et al, U.S. Pat. No. 2,779,512 of Jan. 29, 1957; HETLAND et al, U.S. Pat. No. 4,162,751 of July 31, 1979; HOENSCH, German Pat. No. 81,360 of Sept. 2, 1894 and HARTMANN, German Pat. No. 233,231 of Mar. 29, 1908.

In these references and other apparatus known to the applicant, a hopper is provided and a rotary disk dispenser with a plurality of pockets is brought in way of the dispensing outlet. In many, if not all, of the devices the pocket is brought to the outlet and with and by rotation is filled by gravity and then the rotary disk is brought in way of an enclosing shroud. A further rotation of the disk enables each pocket to be emptied onto a travelling web. The emptied pocket is then rotated again to the hopper outlet. Very minute changes in the volume of the pocket are desirable since the material dispensed in usually by weight. Each pocket must also be equal as to volume.

In the present invention a precise and equal change in the volume of each pocket is provided by a tapered plug which is moved in and out to cause a supporting pin or member mounted with each pocket to be moved inwardly or outwardly to reduce or expand the capacity of each pocket. The present apparatus not only has a rotary disk having a plurality of pockets in each disk to deposit material onto a travelling web but also a plurality of rotary disks in aligned array is provided for simultaneous emptying of the pockets on a travelling web. Precise capacity is very important because the material to be packaged is a powder that may change its specific gravity because of the humidity or because of manufacturing conditions.

SUMMARY OF THE INVENTION

This invention may be summarized, at least in part, with reference to its objects.

It is an object of this invention to provide, and it does provide, a powder dispenser for acurately measuring a small quantity of powder or granules and delivering same to a travelling web of film. The powder or granules delivered by a chute are rotated at a selected speed. As each pocket comes in way of a discharge outlet of the chute this pocket is filled then moved in way of the close fitting shroud and then delivered to the travelling web at the rate of speed of the web.

It is a further object of this invention to provide, and it does provide, a powder or granule dispenser in which pockets are accurately constructed and are provided in a rotating disk. The volume in each pocket is varied in response to the movement of an actuating pin that engages and moves a spring bottom of each pocket.

It is a still further object of this invention to provide, and it does provide, a dispensing apparatus in which there are a series of chutes each having a dispensing outlet in way of a rotary disk dispenser. These rotary disk dispensers are mounted on a common shaft and by a single manipulation of a common adjustment means the volume of each pocket is increased or decreased.

In brief, this invention contemplates a rotary disk-like element having a plurality of equally spaced and sized pockets, each pocket is adjusted as to volume by raising or lowering a central arc portion of the pocket. Each rotated pocket is fed by a vertical chute outlet into which chute powder or like material is stored. Each rotating pocket is brought in way of this chute outlet and with a determined volume in this pocket and by a wiping portion of the chute shroud this filled pocket is brought to a travelling strip of material for delivery of the contents of the pocket onto this travelling strip. Each pocket is adjusted as to its volume by raising or lowering its central portion. Each central portion of the pocket is moved inwardly or outwardly by means of a pin which is moved in response to a longitudinal actuation of a spine shaft. The shaft has a conical portion formed or provided thereon for each disk-like rotary dispenser.

In practice it is contemplated that several rotary disk-like members are mounted on and are driven at one time by a single drive means. It is to be noted that each pocket provided in a rotary disk-like member includes a spring member bottom and flexible, rubber-like side seal portions which are designed to be attached around the periphery of the pocket and close the pocket to unwanted leakage. Each pocket base or bottom is moved inwardly or outwardly by means of a pin which is actuated to provide an increase or decrease in the volume of the pocket. Pin movement is in response to longitudinal movement of said spine shaft along axial lines of the rotary disk-like member.

In addition to the above summary the following disclosure is detailed to insure adequacy and aid in understanding of the invention. This disclo,ure, however, is not intended to cover each new inventive concept no matter how it may later be disguised by variations in form or additions of further improvements. For this reason there has been chosen a specific embodiment of the rotary dispenser as adopted for use with the dispensing of powder and/or granules and showing a preferred means for product construction and control. This specific embodiment has been chosen for the purposes of

BRIEF DESCRIPTION OF THE DRAWINGS

In the following description and in the claims various details are identified by specific names for convenience. These names are intended to be generic in their application. Corresponding reference characters refer to like members throughout the many figures of the drawings.

DESCRIPTION OF THE PREFERRED EMBODIMENT

Figure 2:
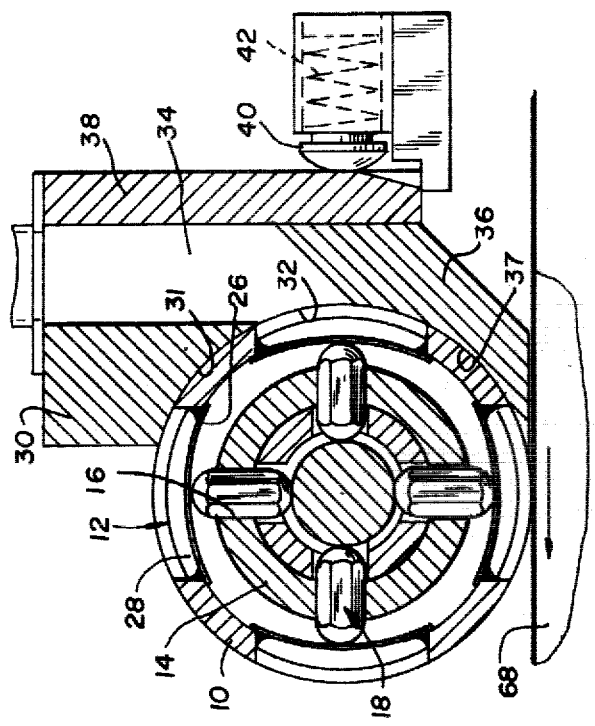
FIG. 2 represents a sectional side view, partly diagrammatic and showing a delivery chute outlet and the rotatable pockets in the disk as carried in a circular path.
Figure 1:
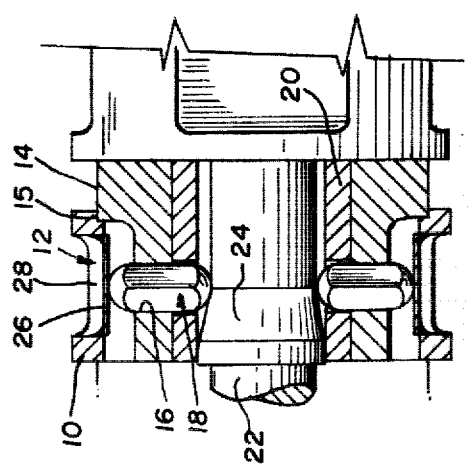
FIG. 1 represents a side view, partly diagrammatic and fragmentary with one rotatable disk-like element shown in section.
Figure 3:
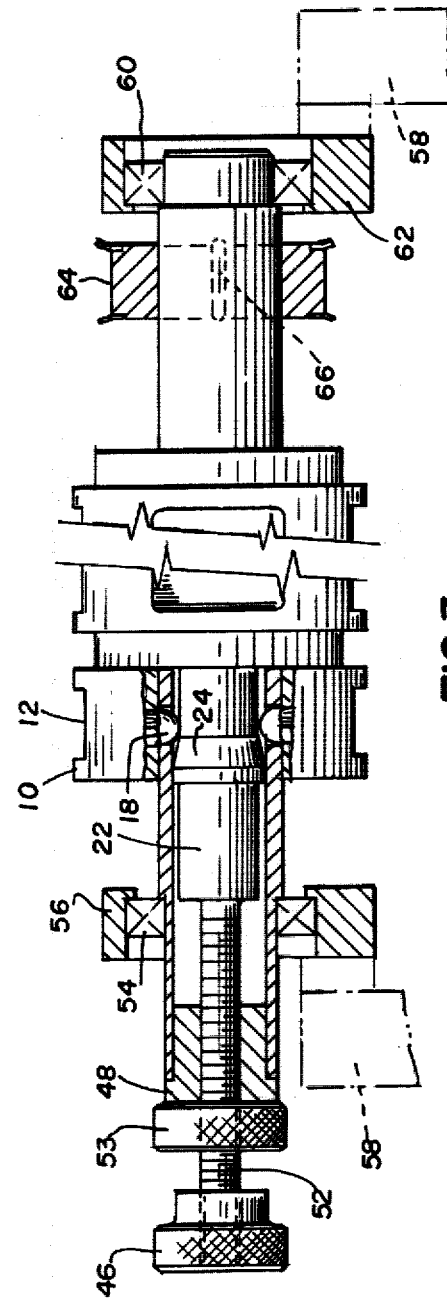
FIG. 3 represents a side view, partly diagrammatic and fragmentary and showing in a sectional portion a means for adjusting the several pockets simultaneously.

As Shown in FIGS. 1, 2 and 3

A diagrammatic and fragmentary showing of the preferred embodiment is illustrated in FIGS. 1, 2 and 3. A rotatable outer disk-like tubular member 10 is formed with a plurality of equally sized and spaced pockets 12. As shown, there are four pockets but more-or-less pockets may be provided as long as the space between the pockets is sufficiently great so that a closing of flow is positively established. This rotatable member 10 is a tubular disk which in turn is carried by and on a tubular inner support member 14. This inner member has a shoulder 15 which is sized and formed to support and position the outer disk-like member 10.

This inner tubular support member 14 is provided with through guide passageways 16. One passageway is provided with each pocket and as depicted are four in number. A pin 18 is removably and slidably carried in each passageway 16. The inner tubular support member 14 is carried by and on a tubular shaft 20 and within this tubular shaft 20 is provided an inner spine shaft member 22. This inner spine shaft is movable within the hollow tubular shaft 20 and corresponding to each rotatable disk-like tubular member 10 there is formed or provided a conical portion 24 on the inner spine shaft 22. These conical portions 24 are disposed to engage and move each series of pins 18.

Each cavity or pocket 12 is closed by a bottom member which is preferably a thin metal spring-like support member 26 to which is applied or secured side retaining portions 28 which are of resilient material such as plastic and the like. As particularly seen in FIG. 2, each disk-like rotary member 10 and its formed pockets are brought in way of a chute 30 having an arcuate recess 31 and outlet 32 formed and provided at its lower end. The disk-like member 10 is revolved in this cutout 31 of a filled chamber or chute 30. Each chute includes a storage area 34 and an angled bottom 36 that is adapted to direct the contents of the chute toward and to the outlet 32. The arcuate shaping of the chute to receive the rotating disk-like member 10 also provides a shroud 37 to slidably engage the rotating disk and wipe the excess material from the pocket and to confine the material in the pocket until discharge. The chute has a rear portion that is closed by a removable rear wall 38. This rear wall is removably held in place by a button 40 which is urged into retaining condition by a spring 42.

Side View of FIG. 3

FIG. 3 represents a diagrammatic side view in a slightly reduced scale of the dispensing apparatus of this invention. As shown the inner spine shaft 22 is moved leftward or rightward within the tubular shaft 20 by means of a knurled knob 46 which rotates in a nut portion 48. This nut portion 48 is fastened to the tubular shaft 20. The nut portion 50 is shown as having a knurled portion 53 permits grasping and locking of the position of spine shaft 22 by an operator. Rotation of the knob 46 moves the shaft 22 and the tapered or conical portion 24 which is moved to increase or decrease the outward position of the pins 18 as they are moved to position the bottom of the pockets 12.

The tubular shaft 20 is reduced at its left end and is mounted in an anti-friction bearing 54 carried in a pedestal support 56. This pedestal support is indicated as mounted on a base support 58. The other end of this shaft 22 is also shown as reduced in diameter and is mounted in another anti-friction bearing 60 in a pedestal 62 which is also carried by the base support 58. The number of side-by-side arrays of disk-like dispensers 10 is merely a matter of selection. Each disk-like dispenser and chute, as in FIG. 2, is selected for the product being packaged. The shaft 22 is rotated in support bearings 54 and 60 by means of a driving pulley or sheave 64. This sheave is secured to the tubular shaft 22 by a key 66 or the like. The rotation of the shaft 22 is in response to the advancement of a strip of film 68.

As shown in FIG. 3, the rotation of the knurled knob 46 in the threaded nut portion 48 moves the conical portion 24 in and out to cause a pin 18 to move the spring support bottom 26 in or out to increase or decrease the capacity of a pocket 12. The movement of the shaft 22 and the conical portions 24 thereon simultaneously makes the desired adjustment for each pocket. It is contemplated that as many as ten dispenser disks may be carried on a common shaft and that they are revolved simultaneously to deliver equal measures of material to the advancing film member 68. More-or-less delivery dispensers can be provided and although four pockets are shown in each disk any reasonable number can be provided as long as the shroud formation 37 between pockets is sufficient to provide a closure of the pocket to a flow of material into the rotating pocket.

Progressive Feeding, Filling and Dispensing

As Shown In FIGS. 4A, 4B, 4C, 4D and 4E

A more-or-less diagrammatic representation is presented in the progressive step-by-step depiction of the dispenser chute and disk-like member associated therewith. Powder is stored in chute 30 and is delivered to a pocket 12 in the disk-like dispenser 10. Each pocket is filled as the disk-like dispenser is brought in way of the outlet 32 of the chute.

Figure 4A:
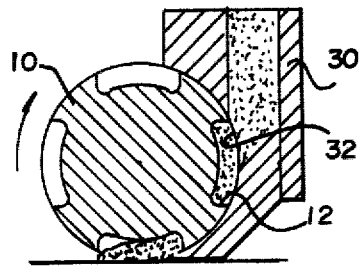
FIGS. 4 A, 4 B, 4 C, 4 D, and 4 E represent diagrammatic side views and showing a progressive feeding, filling and delivering of powdered or granular materials to a travelling web.

In FIG. 4A the rotated disk 10 is shown with the pocket 12 in way of the outlet 32 of the chute 30. This pocket is being filled with material during rotation. Also shown is a filled pocket with the material in this lowermost pocket being transferred to the travelling web of material.

Figure 4B:
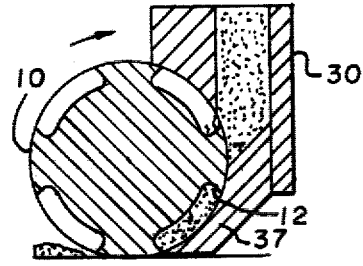

In FIG. 4B the disk is shown as rotated so that the pocket that has been filled by the chute is now brought in way of a shroud portion 37 of the chute. This shroud portion insures that the material in the pocket is retained therein without loss or escape until the pocket is discharged onto the travelling strip of film 68.

Figure 4C:
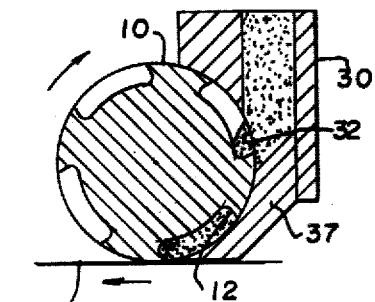

In FIG. 4C the disk has not been rotated to the extent that the lowermost pocket has now been brought to the travelling web 68. The next above or counterclockwise pocket is just being presented to the outlet 32 of the chute.

Figure 4D:
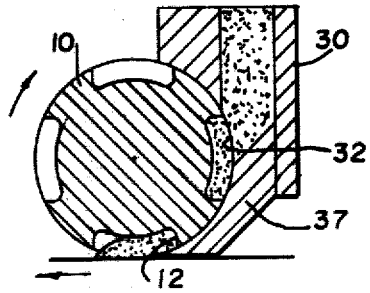

In FIG. 4D, the rotated disk has turned a little more and the lowermost pocket of material is now being deposited on the travelling strip of material. The next above pocket is being filled from the chute with the pocket being partly closed by the shroud portion 37.

Figure 4E:
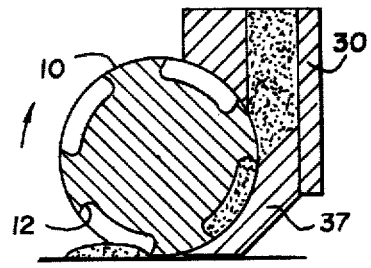

In FIG. 4E the disk has now been rotated to the extent that the dispensed material has been moved by gravity from the pocket and onto the travelling web. At this same time the pocket immediately counterclockwise thereto has been filled and the shroud portion 37 immediately below the discharge engages the material in this pocket to insure the integrity and quantity of the material in the pocket. Rotation of the disk-like dispenser continues for as long as there is material to be metered and dispensed.

Figure 5:
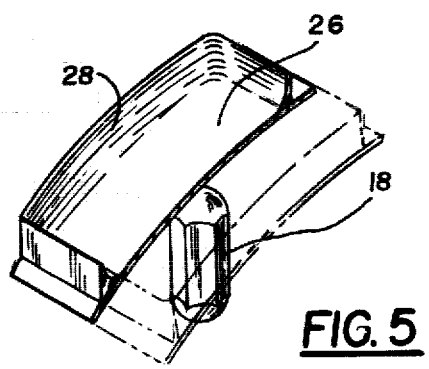
FIG. 5 represents an isometric view, partly diagrammatic in enlarged scale and in section and showing the preferred construction of a pocket bottom and side walls.

Closure Bottom For Pocket As In FIG. 5

Referring next and finally to FIG. 5, there is a diagrammatic representation of the base or bottom provided in each pocket 12. As depicted, the bottom or base includes a spring member 26 which is a thin spring steel strip, preferably stainless. This spring member is longer and wider than the opening of the pocket 12 in the rotary disk 10 providing the pocket. This spring member 26, as seen in FIGS. 1 and 2, is urged into seating condition by a pin 18 which is moved by the tapered conical portion 24. The pin 18 is shortened or lengthened so that in mounted condition each pocket has an identical capacity. Each bottom portion 26 carries on its outer surface side portions 28. These side guide portions 28 are of resilient material so as to tightly engage and prevent unwanted seepage by the edges of the pockets. In use, the formed pocket is measured so that the quantity is very precise. Each pocket is made with similar capability so that when in use the adjustment provided by the knurled knob is immediate and alike in each pocket. Adjustment as to the capacity in each pocket is required because of the change in specific gravity of the material.

The bias of the spring-like support 26, which forms and provides the bottom of the pockets 12, urges the pin 18 toward the conical portion 24 on the shaft 20. This bias causes the pin 18 to be in held or retained condition. Rotary actuation of the knob 46 and the resulting movement of the conical portion causes the desired change in volume in the pocket. The threads and the conical configuration are calibrated so that a selected amount of turn or rotation produces a desired change in the volume of the pocket.

The chute, rotary apparatus and the support for the travelling web are made of readily cleaned and renewed materials. The spring steel base 26 of the pocket also is treated or selected so that the material being packaged is not susceptible to the composition of material in the dispenser. One of the most difficult materials to package is coffee powder such as SANKA (TM General Foods). This and like powdered materials need to be very accurately measured and dispensed and with closely controlled packaging techniques sealed in a package. This apparatus provides such a dispensing capability.

It is to be noted that the pockets 12 are contemplated to be formed with small arcuate corners. With such forming the metal spring-like bottom support member 26 has a small interference with these corners, hence said spring-like member is usually made sufficiently narrow to be easily movable into the opening formed in the pocket 12. The resilient side retaining shoulders 28 are then formed to be a snug seal of the pocket. This is not to preclude the forming of the spring-like bottom 26 with a width greater than the width of the formed pocket 12. With such an arrangement the resilient side shoulder seal portions are adapted to close the pocket 12 to leakage and the volume is changed by moving the spring-like bottom 26 only to the outer member 10 with the spring being moved inwardly to increase the volume of the pocket. No matter the construction of the spring and retaining shoulder, the movement of the pin 18 by the conical portion 24 provides a simultaneous change of colume in a pocket 12.

Terms such as "left," "right," "up," "down," "bottom," "top," "front," "back," "in," "out," "clockwise," "counterclockwise" and the like are applicable to the embodiment shown and described in conjunction with the drawings. These terms are merely for the purposes of description and do not necessarily apply to the position in which the dispensing apparatus may be constructed or used.

While a particular embodiment of the rotary dispenser has been shown and described it is to be understood the invention is not limited thereto and protection is sought to the broadest extent the prior art allows.

What is claimed is:

1. Apparatus for dispensing a measured amount of powder, granular and like material, said material delivered from a chute, this dispenser apparatus having a rotated, disk-like assembly that is revolved in a timed relationship to the advancement of a travelling web of packaging material, this dispenser including:
    (a) an outer, disk-like member which has a tubular configuration and in which is formed a plurality of like-sized and shaped pockets having an established volume in each pocket, these pockets arranged in an equally spaced array with each pocket from filling to delivery and to a refill position maintaining said established volume;
    (b) an inner tubular supporting member having means for engaging, positioning and retaining said outer disk-like member, said tubular supporting member having a plurality of radially disposed passageways formed therein and therethrough, each passageway corresponding to a pocket and disposed to be substantially at the midportion of a pocket;
    (c) a bottom spring-like closure member of a generally sheet-like configuration, said member urged toward and to a shaped pocket to provide a bottom closure for said pocket, said bottom spring-like member in engagement with the undersurface of the outer disk-like member while providing a closure thereof;
    (d) resilient side retaining portions formed on and affixed to each bottom spring-like closure member, said side retaining portion sized and adapted to engage the formed side walls of the shaped pocket to preserve the integrity of the pocket against any leakage of material being dispensed and fed from the chute;

(e) a tubular shaft carried within the inner tubular supporting member and at larger diameter portions adapted to support said inner tubular supporting member and the supported outer disk-like member, this tubular shaft also having radially disposed passageways sized and adapted to communicate with and extend the passageways formed in the inner tubular member;

(f) a spine shaft carried within the tubular shaft and movable therein, this spine shaft having conical cam portions provided thereon, each conical cam portion corresponding to a disk-like dispenser;

(g) a plurality of like sized pins, a pin being carried in each radially disposed passageway and each pin at its outer end adapted to engage the inner surface of the spring-like closure member to urge said member outwardly and at its inner end to engage said conical cam portion on the spine shaft;

(h) a chute disposed to deliver material to a rotary dispenser, each chute having an outlet adapted to feed dispensed material to a pocket when brought in way of said outlet;

(i) a shroud portion in association with said chute, said shroud disposed to close the filled pocket to further filling from said chute and during rotational advancement of the filled pocket to maintain the integrity of the material in this filled pocket;

(j) a travelling web of film adapted, at least in part, to retain the material being dispensed, and means to bring and support this web as it is brought in way of a position at the lowermost point of the rotating disk;

(k) means for rotating and supporting the tubular shaft so that the peripherial speed of the rotated dispenser is at the speed of advance of the travelling web of film, and (l) means for moving the spine shaft and any and all conical cam portions thereon so as to move the pins carried in the radially disposed passageway in the inner tubular supporting member and associated therewith to simultaneously alter to a small extent the volume of each pocket.

2. A rotary dispenser as in claim 1 in which each rotary disk-like member has at least four equally sized and spaced pockets, said pockets so arranged that the pocket, as it is rotated and after filling, is fully closed by that shroud portion below the discharge opening and the travelling web of film.

3. A rotary dispenser as in claim 2 in which each chute is provided with a removable rear wall portion.

4. A rotary dispenser as in claim 3 in which the removable rear wall portion is retained in place by a button-like member and a bias means is provided to urge the button-like member and said removable rear wall portion toward the chute.

5. A rotary dispenser as in claim 1 in which the shroud is provided by and in the arcuate cutout formed in the chute.

6. A rotary dispenser as in claim 1 in which the chute is formed with a sloped bottom, this slope adapted for carrying and guiding material in the chute to the discharge outlet.

7. A rotary dispenser as in claim 1 in which the means for moving the spine shaft is a threaded portion carried by said spine shaft, this threaded portion engaged by a nut portion carried by and rotated with said tubular shaft, the rotation of the threaded portion of the spine shaft in the nut causing a corresponding movement of all the conical portions on the spine shaft.

8. A rotary dispenser as in claim 1 in which the tubular shaft is carried by anti-friction bearings and there are a plurality of disk-like members carried on and by this tubular shaft, and there are a corresponding number of chutes carried by a base support.

9. A rotary dispenser as in claim 8 in which the tubular shaft is rotated by a driven pulley secured to said shaft by a positive drive means.

10. A rotary dispenser as in claim 9 in which the positive drive means is a key in a cooperatively shaped keyway.

11. A rotary dispenser as in claim 1 in which the spring-like support member providing the bottom of each pocket is a strip of spring steel of a width which is less than the width of the opening forming the pocket, and said spring steel strip is longer than the pocket opening and with the ends of said spring-like support biased into retaining engagement of the inner surface of the outer disk-like member.

12. A rotary dispenser as in claim 11 in which the spring steel strip is stainless steel.

13. A rotary dispenser as in claim 11 in which the resilient side retaining portions formed on each spring-like bottom support are a rubber-like composition which is fixedly secured to the outer surface of the spring-like member and with the outer surface walls of the retaining portion slideable in the pocket.

14. A rotary dispenser as in claim 1 in which the tubular shaft is of steel.

15. A rotary dispenser as in claim 1 in which the pins are made of a selected length to provide a determined volume in a pocket, each pin made of a length so as to conform all volumes of said pockets to a like precise amount.

16. A rotary dispenser as in claim 1 in which there is one inner tubular supporting member provided with each outer disk-like member.

* * * * *